United States Patent [19]
Hoover

[11] Patent Number: 5,987,141
[45] Date of Patent: Nov. 16, 1999

[54] STEREO EXPANDER

[75] Inventor: Alan Anderson Hoover, Greenfield, Ind.

[73] Assignee: Thomson Consumer Electronics, Inc., Indianapolis, Ind.

[21] Appl. No.: 08/641,344

[22] Filed: Apr. 30, 1996

Related U.S. Application Data

[63] Continuation of application No. 08/338,971, Nov. 10, 1994, abandoned, which is a continuation of application No. 07/937,578, Aug. 28, 1992, abandoned.

[51] Int. Cl.$^6$ .................................................. H04R 5/00
[52] U.S. Cl. .................................. 381/1; 381/81; 381/24
[58] Field of Search .................................. 381/17, 18, 86, 381/61, 24, 25, 1, 81, 85

[56] References Cited

U.S. PATENT DOCUMENTS

| | | | |
|---|---|---|---|
| 4,742,393 | 5/1988 | Sugai et al. | 358/198 |
| 4,748,669 | 5/1988 | Klayman | 381/1 |
| 4,831,652 | 5/1989 | Anderson et al. | 381/1 |
| 4,979,217 | 12/1990 | Shipley | 381/81 |
| 5,005,201 | 4/1991 | Rumreich et al. | 381/24 |
| 5,042,068 | 8/1991 | Scholten et al. | 381/1 |
| 5,181,247 | 1/1993 | Holl | 381/24 |

FOREIGN PATENT DOCUMENTS

| | | | |
|---|---|---|---|
| A0383 535 | 8/1990 | European Pat. Off. | H04N 5/60 |
| 8120361 | 1/1990 | Germany | H04S 1/100 |

*Primary Examiner*—Curtis Kuntz
*Assistant Examiner*—Ping W Lee
*Attorney, Agent, or Firm*—Joseph A. Tripoli; Peter M. Emanuel; Frederick A. Wein

[57] ABSTRACT

A stereophonic audio processing system having left and right stereophonic sound channels with respective loudspeakers therefor is presented. The system is provided with spatial expansion of the stereophonic sound so that a first pair of spaced-apart loudspeakers will acoustically appear to be spaced further apart then they actually are. The audio system is provided with provisions for connecting a second pair of loudspeakers which can be spatially located at a distance between the loudspeakers which is larger than the first pair of loudspeakers. The audio system is provided with apparatus for providing stereo sound without spatial expansion when such secondary loudspeakers are used.

4 Claims, 2 Drawing Sheets

STEREO EXPANDER

This is a continuation of application Ser. No. 08/338,971, filed Nov. 10, 1994, ABN, which is a continuation of application Ser. No. 07/937,578, filed Aug. 28, 1992, ABN.

BACKGROUND

The present invention relates to spatial expansion of the apparent spacing between two stereophonic loudspeakers, and more particularly, to providing stereo sound without spatial expansion when the spaced-apart distance between a pair of loudspeakers is sufficiently large so that expansion is not desired.

Spatial stereo expansion in audio systems is well known in the art and has been available for many years. In such systems, the left and right channel signals are processed in a manner so that it appears to the listener that the distance of separation of the loudspeakers is much greater than the actual physical separation of the loudspeakers. This is called psycho-acoustic expansion. Examples of spatial stereo expansion are shown in U.S. Pat. No. 4,495,637 of Bruney, and U.S. Pat. No. 4,831,652 of Anderson. In such spatial expansion systems, a portion of the signal from the other channel is added in reverse phase, to the signal of the subject channel such that an ambience of spaciousness is introduced between the left and right channels. This ambience of spaciousness is independent of any separation in the original signal of the two channels. This feature has the desirable characteristic of making the acoustic perceived stereo image seem wider than the actual locations of a pair of stereophonic loudspeakers.

This is particularly desirable for the normal spacing of loudspeakers built into a cabinet of a television receiver or small radio, where the stereo speaker spacing between loudspeakers is typically only about 26–80 cm. apart. In such an arrangement, the perceived stereo effect is greatly improved with the perceived spatial expansion of the loudspeakers.

One well known method of increasing the perceived spatial expansion between stereophonic loudspeakers is by increasing the (L−R) signal level with respect to the (L+R) signal level when the signals are applied to the decoder matrix to form the L and R signals.

An undesirable effect of the spatial "expanded stereo" is that the (L−R) ambiance sound can be too loud compared to the (L+R) sound, often resulting in a center-stage vocalist between "drowned out" by the ambiance sound, or by the tonal variations between stereo and monophonic modes being large in extent. These objections, particularly the latter, can be more noticeable when using the auxiliary hi-fi output jacks sometimes provided in a TV sound system where the L and R signals can be applied to a high quality stereophonic reproduction system.

For the above reasons, it is desirable to provide a stereo signal without spatial expansion in a system which provides for the spatial stereo expansion when auxiliary loudspeakers are used.

Additionally, when auxiliary loudspeakers are used, i.e., loudspeakers disposed external of the television cabinet, these auxiliary loudspeakers can be placed at spaced-apart distances much greater in extent than the loudspeakers of the television receiver cabinet. For such a case, the rationale for using spatial expanded stereo is no longer applicable.

SUMMARY OF THE INVENTION

Briefly, the present invention relates to a stereophonic audio processing system having left and right stereophonic sound channels with respective loudspeakers therefor. The system is provided with spatial expansion of the stereophonic sound so that a first pair of spaced-apart loudspeakers will acoustically appear to be spaced further apart then they actually are. The audio system is provided with provisions for connecting a second pair of loudspeakers which can be spatially located at a distance between the loudspeakers which is larger than the first pair of loudspeakers. The audio system is provided with apparatus for providing stereo sound without spatial expansion when such secondary loudspeakers are used.

BRIEF DESCRIPTION OF THE DRAWINGS

Reference can be had to the drawings wherein like members are given like numerals and wherein.

DETAILED DESCRIPTION OF THE PREFERRED EMBODIMENT

Figure 1:
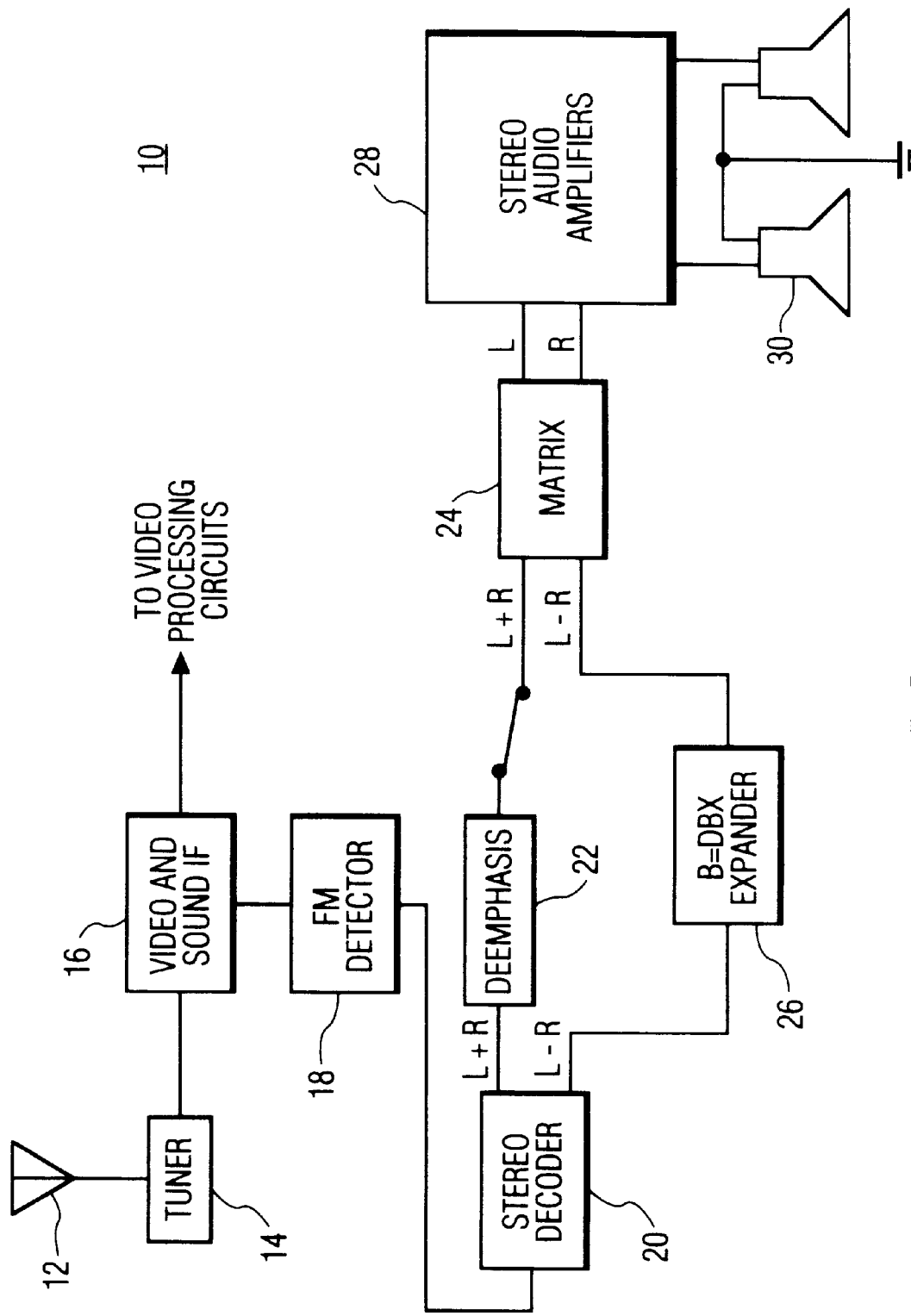
FIG. 1 shows a block diagram of a television receiver having a stereophonic audio system.

FIG. 1 shows a commonly available television receiver, generally designated 10. A broadcast television signal received by an antenna 12 (or coupled to the receiver via a cable television system) is applied to a tuner 14 for channel selection. Tuner 14 converts a selected one of a plurality of received television signals from its respective broadcast frequency to a common intermediate frequency (IF). The IF frequency television signal is applied to a video and sound IF unit 16 which produces a baseband video signal and a frequency modulated (FM) sound carrier. The video and audio signals are separated, and the video signals are applied to video signal processing circuitry including a video display device (not shown). A stereophonic sound audio signal is detected from the FM sound carrier by an FM detector 18 and applied to a stereo decoder 20. Stereo decoder 20 provides an L+R stereo sum signal and an L−R stereo difference signal. The (L+R) stereo sum signal is deemphasized in a deemphasis unit 22 (i.e., a low pass filter having an appropriate time constant) and applied to one input of a stereo matrixing unit 24 in which the original left (L) and right (R) stereo signals are reconstructed. The (L−R) stereo difference signal from stereo decoder unit 20 is applied, in the exemplary embodiment, to an expander unit 26. In the exemplary embodiment, expander unit 26 corresponds to a full DBX™ expander. However, such an "expander" is incidental to the present invention, and any expander or no expander can be used. Such a type of "expander" provides a complementary signal processing of a signal compander applied to the audio signal at the signal source in order to provide noise reduction in the (L−R) signal. Accordingly, expander 26 is an amplitude and spectral expander which also provides deemphasis for the (L−R) signal. This amplitude and/or spectral expansion is independent of the spatial expansion discussed below which is the subject of the present invention. The amplitude and/or spectral expanded (L−R) stereo difference signal is applied to the other input of stereo matrix unit 24. The reconstructed left (L) and right (R) stereo signals are applied to stereo audio amplifier unit 28 for amplification and ultimate reproduction in a dual speaker unit 30.

It is well known that a spatial stereo expanded effect can be achieved by providing an level of the (L−R) signal to matrix 24 which is greater than the (L+R) signal also provided to matrix 24. For the reasons discussed above, it is desirable to defeat this spatial expansion effect when auxiliary loudspeakers are connected to the apparatus since these loudspeakers can be physically spaced at distances greater than the original loudspeakers, which typically are provided within the confines of the cabinet. Also as discussed above, when external loudspeakers are used which can be spaced apart further than the loudspeakers internal to the cabinet, it is desirable to provide these external loudspeaker with a stereo signal having no stereo spatial expansion.

Figure 2:
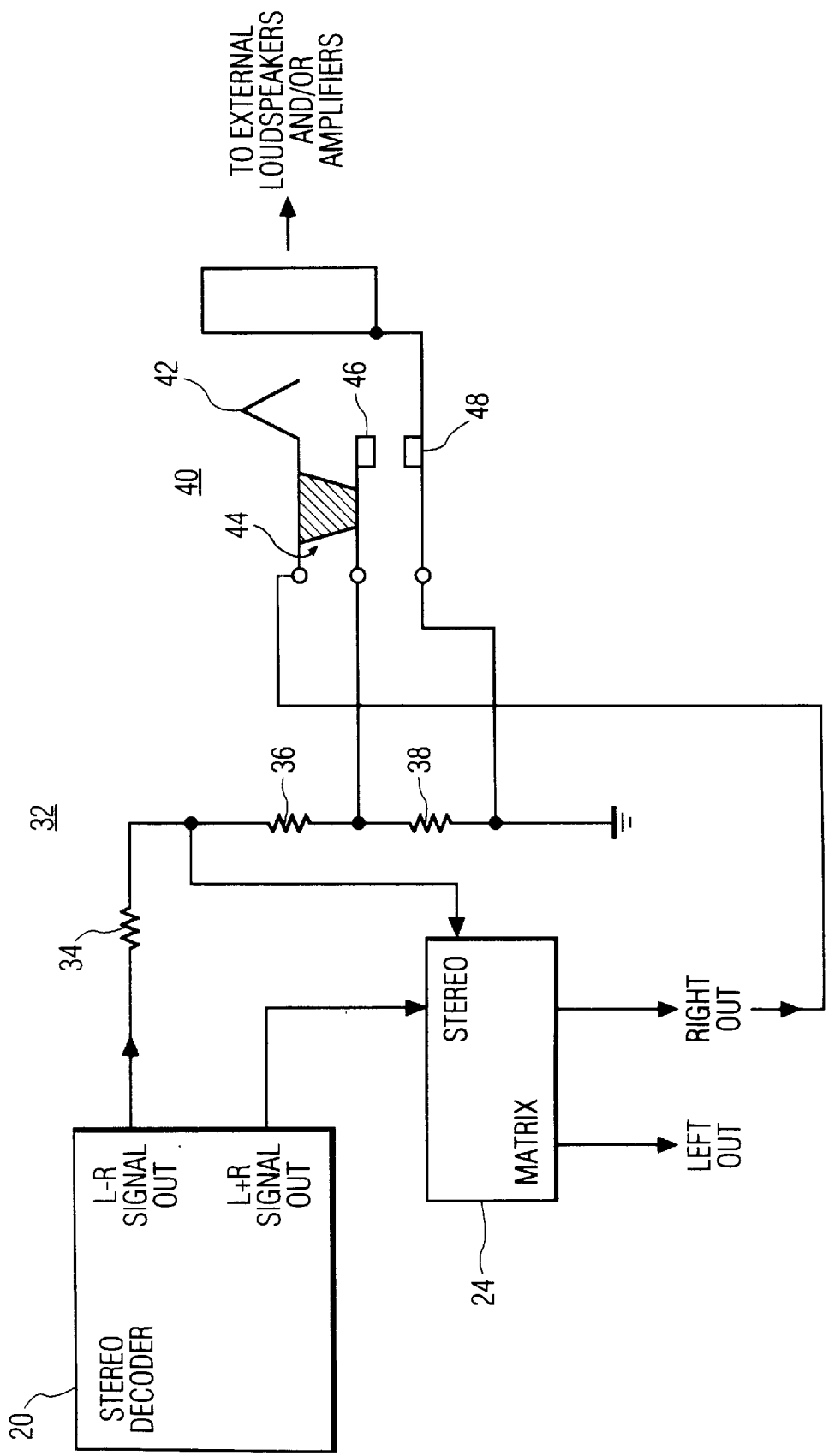
FIG. 2 shows a partial block diagram of the television receiver of FIG. 1 according to aspects of the present invention.

Referring now to FIG. 2, there is shown the exemplary embodiment for providing such a stereo signal without spatial stereo expansion. Stereo decoder 20 provides an output (L−R) signal at an amplitude greater than the output (L+R) signal out with both of the signals being provided to the stereo matrix 24. The increased amplitude of the (L−R) signal can be provided in many ways, e.g., with additional amplifier gain or decreased feedback (not shown). The emphasis network 22 and expander network 26 are not shown in this drawing, and if used, can be appropriately placed in accordance with FIG. 1. The relatively increased amplitude (L−R) signal is provided to stereo matrix 24 through an attenuator 32 made up of resistors 34, 36, and 38, with resistor 38 coupled to ground. In the spatial expansion mode, the (L−R) signal provided to stereo matrix 24 is attenuated by the sum of resistors 36 and 38 divided by the sum of resistors 34, 36 and 38. In this manner the increased amplitude of the L−R signal can be precisely determined.

In the exemplary embodiment, a second pair of loudspeakers can be used by providing the stereophonic signals to external loudspeakers and/or amplifiers (not shown). A switching jack 40 is provided with a contact 42 for coupling the R signal from the decoder matrix 24 to the external system. Switching jack 40 is arranged with a insulating contactor 44 which mechanically short-circuits contact 46 with contact 48 when a plug (not shown) is physically inserted into jack 40. In such an event, contacts 46 and 48 short circuit resistor 38 changing the attenuation ratio of attenuator 32. In the plug inserted mode, the amplitude of the (L−R) signal provided to stereo matrix 24 is the ratio of resistor 36 divided by the sum of resistors 34 and 36. In this mode, the (L−R) signal provided to stereo matrix 24 is reduced to the extent that the amplitude is equal to the amplitude of the signal (L+R) provided to the stereo matrix. With equal amplitudes of signal (L+R) and (L−R), the spatial expansion effect for the stereophonic sound is not produced. Thus, when the stereophonic signals are provided to external loudspeakers and/or amplifiers with the external loudspeakers capable of being spaced apart at distances sufficient to give a better stereophonic effect, the spatial expansion which is no longer necessary, is not provided.

It should be noted that the exemplary attenuator and the switching of the attenuator can just as well be provided in the left channel as well as the right channel. It should also be noted that the external loudspeakers and/or amplifiers can be connected through non-switching jacks or terminals with a panel selector switch being provided for selecting such second pair of loudspeakers and/or amplifiers. In such a case provision can also be made for the providing of stereophonic signals to the second pair of loudspeakers and/or amplifiers without spatial expansion. It should also be noted that the present invention can be used with FM stereo radios or the like, wherein the stereo loudspeakers are closely spaced apart.

I claim:
1. Apparatus comprising,:
   stereophonic audio signal processing means for providing left and right stereophonic sound signals, said left and right sound signals being derived from (L+R) and (L−R) signals coupled to a matrix;
   means for modifying the left and right stereophonic sound signals for providing left and right stereophonic sound signals with an additional spatial expansion effect, said additional spatial expansion of the stereophonic sound signals being generated by coupling the (L−R) signal to the Matrix at an amplitude greater than the (L+R) signal coupled to the matrix;
   means for coupling the modified left and right stereophonic sound signals to a first pair of loudspeakers,
   means for connecting a second pair of loudspeakers for respectively receiving the left and right stereophonic sound signals, and
   means for removing the modification of the left and right stereophonic sound signals for providing the additional spatial expansion effect of the left and right stereophonic sound signals concurrently with the second pair of loudspeakers being connected;
   the means for removing the additional spatial expansion effect of the stereo sound signals comprising means for equalizing the amplitudes of the (L−R) and (L+R) signals coupled into the matrix.

2. The apparatus of claim 1 wherein the means for equalizing comprises a switching jack which is switched upon insertion of a plug into the jack for changing a voltage divider ratio for the (L−R) signals coupled to the matrix.

3. The apparatus of claim 1 wherein the equalizing of amplitudes of the (L−R) and (L+R) signals is provided by an attenuator.

4. A television apparatus comprising:
   means for receiving a signal having picture components including chroma and luminance, and sound components,
   means for processing the picture components,
   means for processing the sound signal components comprising a sound IF means, a detector means for providing an (L−R) signal and an (L+R) signal, and matrix means for producing L stereophonic sound and R stereophonic sound signals from the (L−R) and (L+R) signals;
   means for providing a first pair of loudspeakers spaced apart a first distance;

means for modifying the left and right stereophonic sound signals for providing an additional spatial expansion effect of the apparent first distance of separation between the first pair of loudspeakers and providing said modified signal to the first pair of loudspeakers, said means for modifying coupling the (L−R) signal provided to the matrix at an amplitude greater than the (L+R) signal provided to the matrix;

means for connecting a second pair of loudspeakers for receiving the L and R stereophonic sound signals, and means for removing the modification of the left and right stereophonic sound signals for providing the additional spatial expansion effect of the L and R stereophonic sound signals concurrently with the second pair of loudspeakers being connected;

the means for removing the additional spatial expansion of the stereo sound signals comprising means for equalizing the amplitudes of the (L−R) and (L+R) signals coupled into the matrix;

the means for equalizing comprising a switching jack which is switched upon insertion of a plug into a switching jack which changes a voltage divider ratio for the (L−R) signals coupled to the matrix.

* * * * *